United States Patent [19]

Igarashi

[11] Patent Number: 5,020,004
[45] Date of Patent: May 28, 1991

[54] IMAGE OUTPUT APPARATUS CAPABLE OF OUTPUTTING FORMS IN SPECIAL COLORS

[75] Inventor: Masaru Igarashi, Yokohama, Japan

[73] Assignee: Canon Kabushiki Kaisha, Tokyo, Japan

[21] Appl. No.: 299,447

[22] Filed: Jan. 23, 1989

[51] Int. Cl.$^5$ .................................... G06K 15/00
[52] U.S. Cl. ............................ 364/519; 364/200; 364/964
[58] Field of Search ................. 364/518–520, 364/930 MS, 235 MS, 964 MS, 964.1 MS, 964.7 MS; 346/154, 157; 400/61; 358/296, 298

[56] References Cited

U.S. PATENT DOCUMENTS

| | | | |
|---|---|---|---|
| 4,081,604 | 3/1978 | Kanaiwa | 364/519 |
| 4,241,415 | 12/1980 | Masaki et al. | 364/519 |
| 4,682,190 | 7/1987 | Ikeda | 364/519 |
| 4,809,037 | 2/1989 | Sato | 346/157 |

Primary Examiner—Arthur G. Evans
Attorney, Agent, or Firm—Fitzpatrick, Cella, Harper & Scinto

[57] ABSTRACT

An image output apparatus for the composite printing of images in at least two colors includes an internal memory for storing plural items of form information along with output-color information peculiar to each item of form information. When character symbol information inputted from an external unit is printed out after one item of form information is selected, a form pattern expressed by the selected form information is printed out in an output color of its own.

18 Claims, 8 Drawing Sheets

IMAGE OUTPUT APPARATUS CAPABLE OF OUTPUTTING FORMS IN SPECIAL COLORS

BACKGROUND OF THE INVENTION

This invention relates to an image output apparatus, and more particularly, to an image output apparatus which outputs image information such as character symbol information and form information.

When character symbols are printed on a form, the conventional practice is to set a blank form in a printing apparatus and print character data, which is outputted by a host computer or the like, on the form.

The forms used in business usually are of a wide variety of types, designed for a diversity of purposes. If a desired form has not been loaded in the printing apparatus, the form presently in the printing apparatus must be exchanged for the desired form before printing can take place. This is a troublesome operation.

The forms used in many enterprises are assigned various colors so that the use or type of form can be identified by its color. However, management of such a wide variety of forms is still required and an operator must carefully consider which form is to be set in the printing apparatus. It would be desirable to reduce the burden which this places upon the operator.

SUMMARY OF THE INVENTION

Accordingly, an object of the present invention is to provide an image output apparatus which is capable of overcoming the problems of the prior art.

Another object of the present invention is to improve an image output apparatus for outputting image information of character symbols or form patterns, etc.

Still another object of the present invention is to provide an image output apparatus which is capable of outputting a desired form.

A further object of the present invention is to provide an image output apparatus which has a simple construction and outputs desired image information.

A yet further object of the present invention to provide an image output apparatus capable of outputting a form within a desired color without complicated operation.

According to the present invention, the foregoing objects are attained by providing an image output apparatus comprising input means for inputting data, processing means for processing data inputted by said input means and for outputting image information based on processed data, said processing means including a first memory unit for storing data related to form information to be outputted and a second memory unit for storing color information representing a reproduction color of for reproducing said form information.

Another object of the present invention is to provide an image output apparatus which makes it unnecessary to manage forms having specific colors, wherein, once a form has been selected, all that need be done thereafter is to output the desired character information to enable printing of any number of the forms, which bear the required subject matter thereon.

According to the present invention, the latter object is attained by providing an image output apparatus for composite printing of images having at least two colors, comprising input means for inputting character information, first printing means for printing the inputted character information on a prescribed printing medium, memory means for storing plural items of form information along with output color information peculiar to each item of form information, selecting means for selecting one item of stored form information, pattern generating means for generating a form pattern expressed by the form information selected by the selecting means, and second printing means which, when the character or symbol information is printed on the printing medium by the first printing means, prints the form pattern generated by the pattern generating means on the printing medium in the output color proper to the form.

A further object of the invention is to provide an image output apparatus of the aforementioned type which is high in speed. According to the invention, this object of the invention is attained by providing an image output apparatus for composite printing of images having at least two colors, comprising input means for inputting character symbol information, first printing means for printing the inputted character symbol information on a prescribed printing medium, memory means for storing plural items of form information along with output color information peculiar (or at least proper) to each item of form information, selecting means for selecting one item of stored form information, holding means for holding a form pattern expressed by the form information selected by the selecting means, and second printing means which, when the character symbol information is printed on the printing medium by the first printing means, prints the form pattern held by the holding means on the printing medium in the output color peculiar to the form.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of the present invention will now be described in detail with reference to the accompanying drawings.

Figure 1:
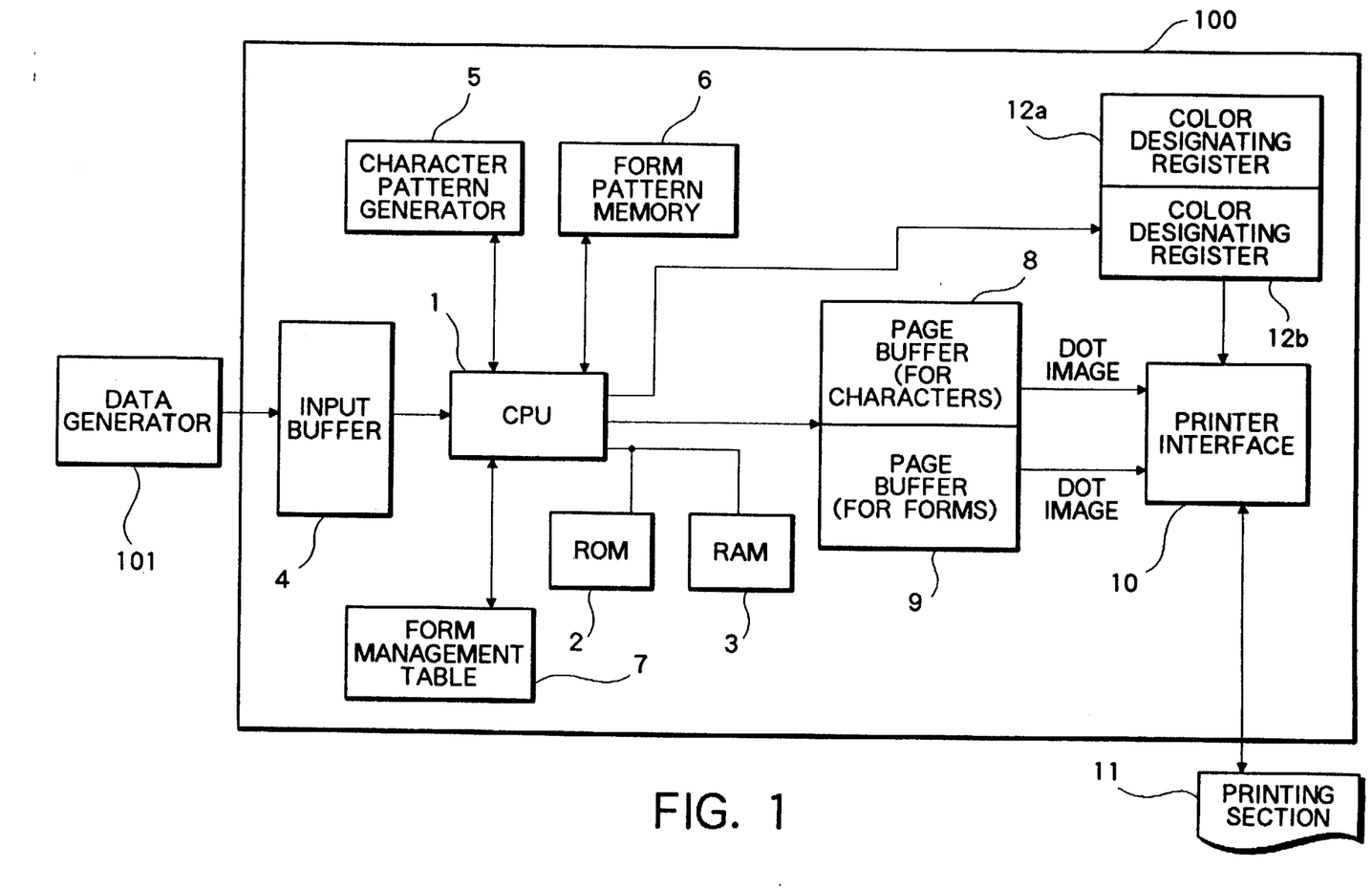
FIG. 1 is a block diagram illustrating an embodiment of a printing apparatus according to the present invention.

FIG. 1 is a block diagram illustrating an embodiment of a printing apparatus according to the present invention. The image output apparatus includes a control section 100 for outputting image information based on data inputted from an external unit 101, and a printing section 11 for actually printing out information on the printing medium. Numeral 101 denotes a data generator (e.g., a host computer) for outputting character codes (inclusive of various control codes and image data).

The control section 100 includes a CPU 1 for overall control of the control section, a ROM 2 storing a processing procedure (see the flowchart of FIG. 7) in accordance with which the CPU 1 executes processing, a RAM 3 used as the work area, etc., of the CPU 1, an input buffer 4 for temporarily storing information outputted by the data generator 101, and a character pattern generator 5 for generating a pattern corresponding to a character symbol code in information applied thereto. The character generator 5 generates various type-style patterns, such as Gothic-type patterns and Italic patterns. The control section 100 further includes a form pattern memory 6 storing a plurality of form patterns made up of various data, and a form management table 7 for managing the form pattern memory 6. Though the contents of the form pattern memory 6 and form management table 7 will be described in detail hereinbelow, both are constituted by writable nonvolatile memory devices. This makes it possible to register new forms and to preserve the stored information even when the printer power supply is turned off.

The control section 100 is also provided with page buffers 8 and 9 capable of developing an image of one page. A character symbol pattern to be printed on a form is developed in page buffer 8, and a form pattern is developed in page buffer 9. The image data developed in each of the page buffers 8 and 9 is outputted to the printing section 11 via a printer interface 10. At this time a color designating instruction for designating the colors of the image data developed in the page buffers 8 and 9 is outputted to the printing section 11. In actuality, color designation is achieved by storing color data in color designating registers 12a and 12b. Accordingly, if, by way of example, data corresponding to the color black is set in color designating register 12a and data corresponding to the color red is set in color designating register 12b, the form will be printed in red and items mentioned on the forms, namely character symbols and the like, will be printed in black.

Figure 2:
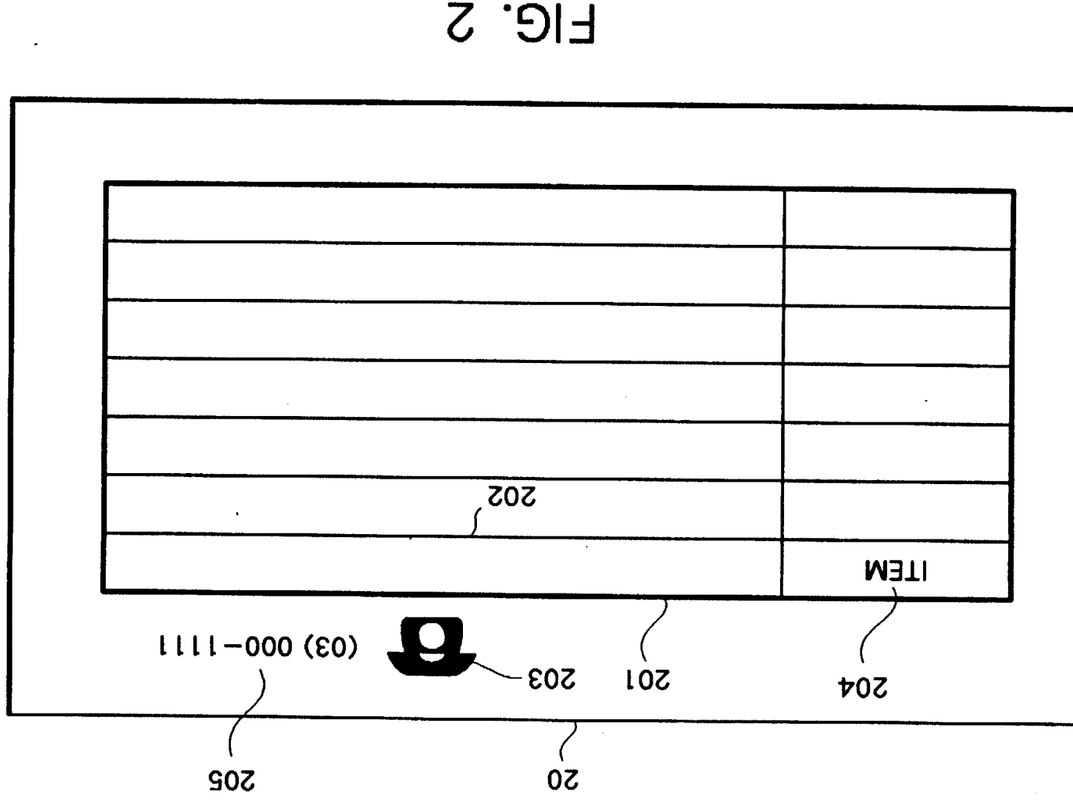
FIG. 2 is a view illustrating an example of a form.

FIG. 2 illustrates an example of a form, designated by numeral 20.

The form 20 includes bold lines 201, fine lines 202, a logo mark (which may be a company symbol mark or the like) 203, and character strings 204 and 205, by way of example. In other words, it is possible to reproduce the form 20 if these items of data are given. It is exactly these data that are stored in the form pattern memory 6 of the illustrated embodiment.

Figure 3:
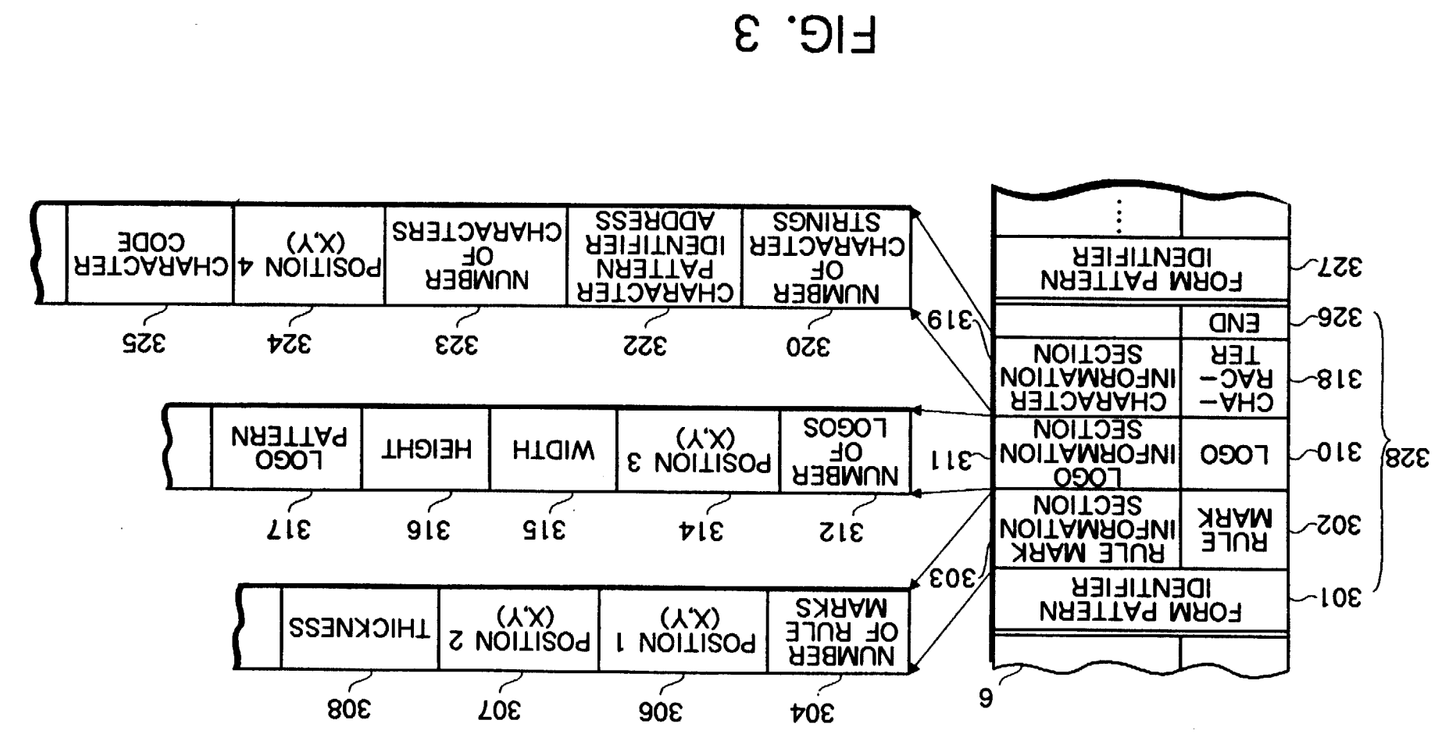
FIG. 3 is a view illustrating the contents stored in a form pattern memory of the embodiment FIG. 1.

The data corresponding to form 20 are as shown in FIG. 3, by way of example. As shown in FIG. 3, the form 20 is composed of a form pattern identifier 301 which enables the form to be specified, and form information 328 necessary for reproducing the form 20. The form information 328 is composed of rule mark information 303, logo information 311, character information 319, identification information 302, 310 and 318 which makes it possible to identify each item of information, and identification information 326 indicating the end of data.

The rule mark information 303 has an area 304 which stores the number of rule marks used on one form. Areas 306 and 307 store, in the form of X and Y coordinates, the starting point and end point of one rule mark. An area 308 stores information relating to rule mark thickness. The number of items of rule mark data expressed by the areas 306-308 correspond to the number of rule marks stored in the area 304, and these items of data follow the rule mark number data. It should be noted that the area 308 can be adapted to store the type of rule marks, such as dotted lines or double lines, besides the rule mark thickness information. In such case, several bits of the data stored in area 308 would be used in order to specify the type of rule mark, and the remaining bits would be used in order to specify the thickness of the rule mark.

The logo information 311 has an area 312 storing the number of logo marks. An area 314 stores, in the form of X and Y coordinates, the position at which one logo mark is developed therein. Areas 315 and 316 store logo mark width and height information, and an area 317 stores the actual logo pattern.

The character information 319 has an area 320 which stores the number of sets of character strings. Since the form 20 of FIG. 2 has the two character strings 204 and 205, the area 320 stores data indicative of the number "2". An area 322 stores address information which specifies the classification of type style for one character string. An area 323 stores the number of characters constituting the character string, and an area 324 stores, in the form of X and Y coordinates, the end point of the character string. An area 325 stores character codes of the characters constituting the character string, with the number of codes being equivalent to the number of codes mentioned above. Information for the second of the two character strings is stored following area 325. It should be noted that the type of characters in a for pattern can be changed from, e.g., from Gothic to Ming, merely by changing the address information stored in area 322.

Before outputting the data (character codes) to be printed on a form, the data generator 101 outputs a control code designating on which form the data are to be printed. In this case the CPU 1 must set which form pattern is to be employed, based on the inputted control code. Accordingly, the form management table 7 is provided in accordance with the embodiment in order to facilitate a series of decisions for the purpose of setting the form pattern. The contents of the table are as shown in FIG. 4.

Figure 4:
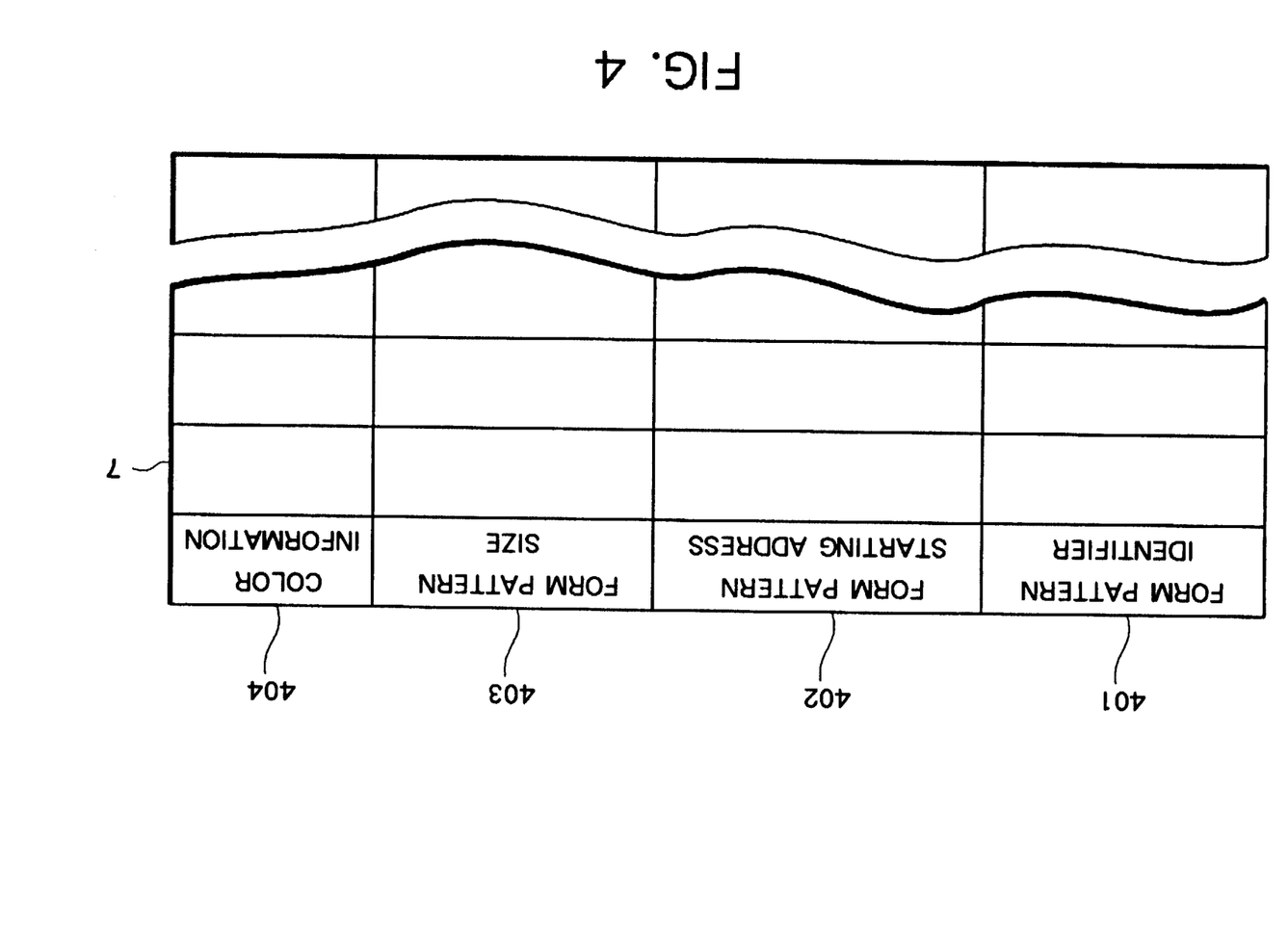
FIG. 4 is a view illustrating the contents stored in form management table of the embodiment FIG. 1.

In FIG. 4, an area 401 stores form pattern identifiers for determining which form pattern is being designated by the control code. Areas 402 and 403 following the area 401 store data which indicate how much form pattern data there are (i.e., an offset address) and from what position (starting address) of the form pattern memory 6 these data start. An area 404 stores the output color of the form pattern.

Thus, when the data generator 101 outputs a control code which selects a form pattern, first the CPU 1 refers to the form management table 7 and selects the designated form. It is thus possible to determine where in the form pattern memory 6 the desired form pattern has been stored. Thereafter, in accordance with this form information, the CPU 1 completes the desired form pattern by arranging the rule marks, logo mark and character patterns and the like in page buffer 9. In order to make the output color of the form pattern developed in page buffer 9 the color stored in the area 404, this color information is set in the color designating register 12b. From this point onward, the pattern in the page buffer 9 and the contents of the color designating register 12b are kept as they are so long as a new form designating control code is not received. Only the patterns corresponding to inputted character symbol codes are developed in the page buffer, and the images in the page buffers 8 and 9 are printed out in composite form by the printing section 11. As a result, a form on which the required particulars appear in the specified colors can be printed out in successive fashion. It should be noted that in a case where the data generator 101 has outputted a blank code, a page-eject code or the like, the apparatus prints out a blank form, namely a form on which entries have not been made.

Registration of a form pattern will now be described.

Basically, to register a form pattern, the apparatus is made to recognize form pattern registration and the form pattern information 328 for reproducing the form pattern is inputted to the apparatus. In accordance with the illustrated embodiment, the data generator 101 inputs registration information, through the same route as the character symbol codes, when a new form pattern and the color in which it is to be printed are registered in the printing apparatus. In order to distinguish registration information from an ordinary character symbol code, control codes (e.g., control codes having an escape sequence format) indicative of the fact are provided at the beginning and end of the registration information. Any control code will suffice as long as the apparatus is capable of recognizing that it is not indicative of print data.

Figure 5:
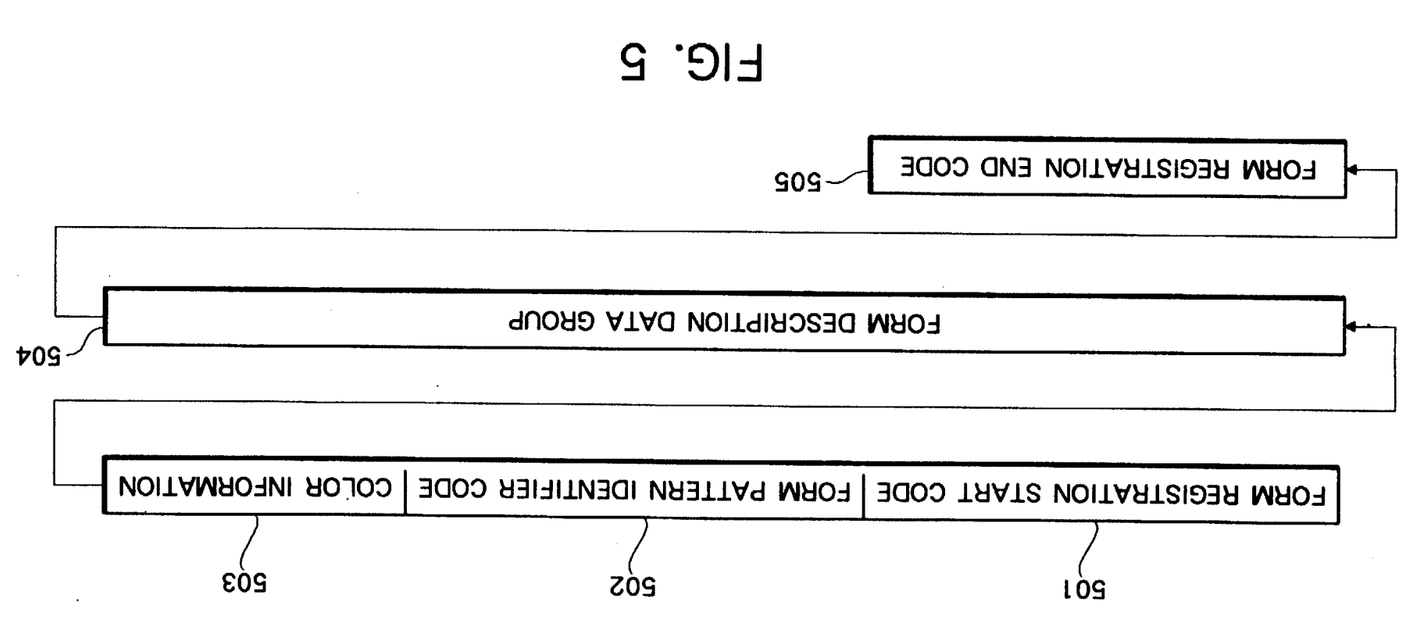
FIG. 5 is a view showing a data output format when a form is registered in accordance with that embodiment.

FIG. 5 illustrates a data format relating to form registration according to the present embodiment.

As shown in FIG. 5, first there is form registration start code 501, followed in succession by form pattern identifier information 502, color information 503 and form description data 504 (e.g., the starting and end points of line segments, line thickness, etc.), which are various data for producing a form, and finally a form registration end code 504 signifying the end of a series of data. On the basis of these data, the CPU 1 constructs new data in the form pattern memory 6 and form management table 7.

Figure 6:
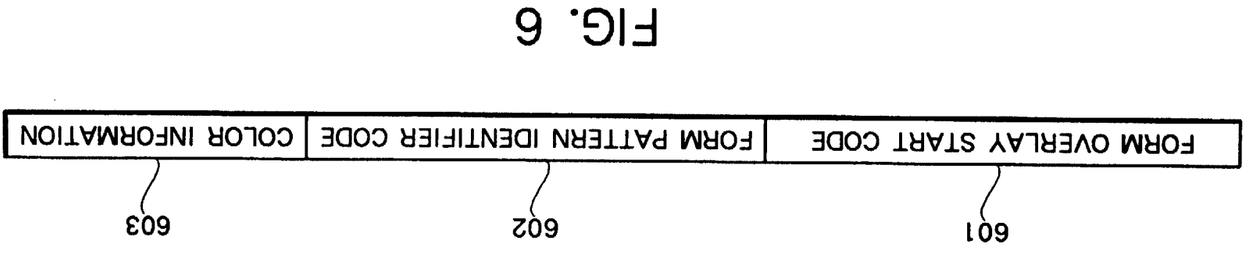
FIG. 6 is a view showing an instruction format when changing an output color of a form in accordance with that embodiment.

In the present embodiment, it is also possible to revise a portion of a form already registered. For instance, if the color information of a specific form is to be changed, it will suffice to output a control code to this effect (a form overlay start code 601), followed by a form pattern identifier code 602 for the form which is the object of the change, and then color information 603 indicative of the color update. Upon receiving these items of information, the CPU 1 rewrites, by way of the new color information 603, the color information of area 404 corresponding to form pattern identifier in the form management table.

Figure 7:
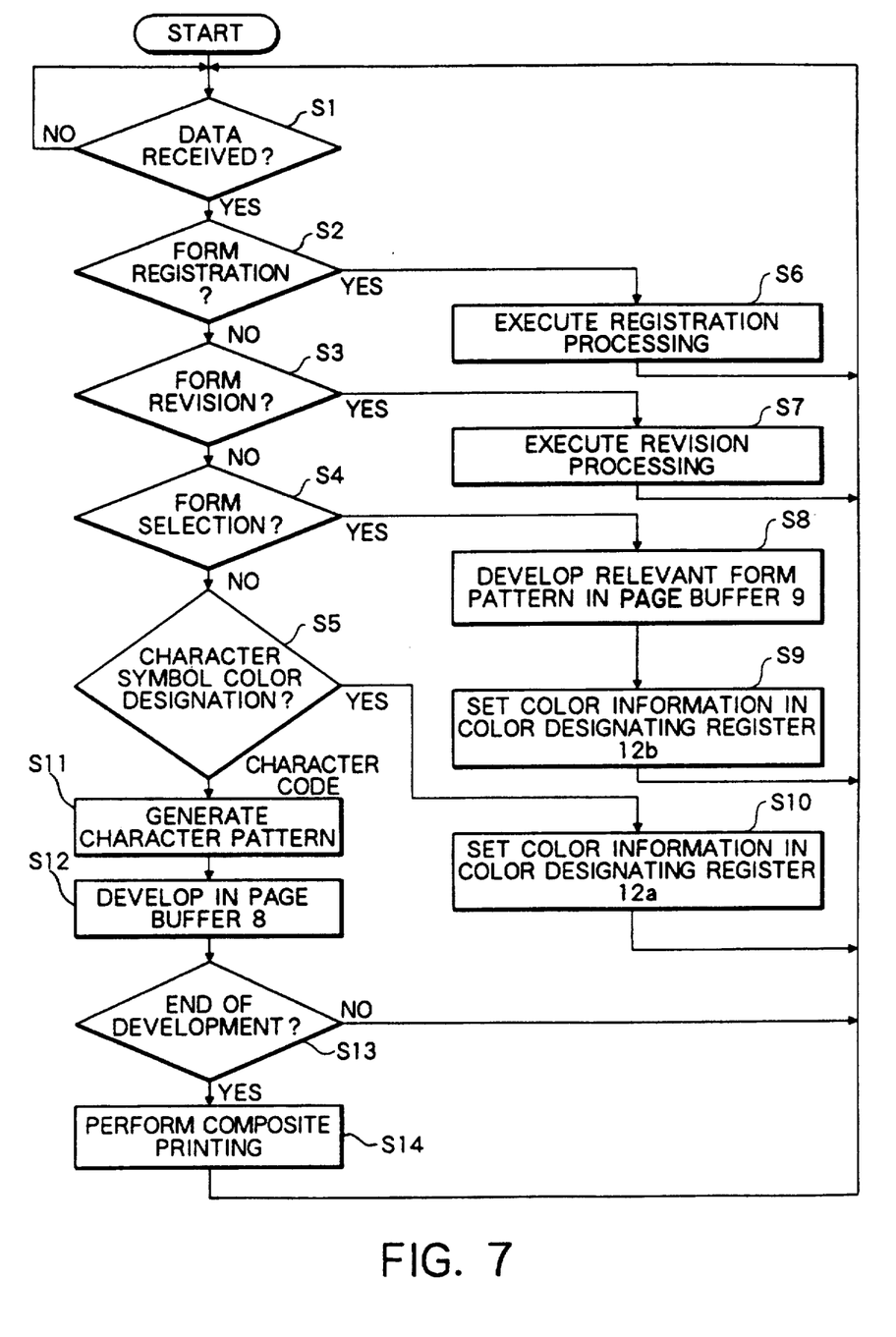
FIG. 7 is a flowchart for describing the operating procedure of the printing apparatus of that embodiment.

The details of a series of processing steps performed in the apparatus described above will now be described in accordance with the flowchart of FIG. 7.

When power is introduced to the printing apparatus, various initial settings are made and the program proceeds to step S1 of the flowchart. This steps calls for a determination as to whether data have been received from the data generator 101, namely whether data have been stored in the input buffer 4. This is followed by the processing of steps S2–S5, at which it is determined whether the received data are indicative of form registration, form revision (color revision) or form selection, and whether the color of characters to be printed is to be set.

If it is determined that the received data are indicative of control data relating to form registration, for example, then the program proceeds from step S2 to step S6, at which processing for the registration of a new form is executed. If the received data are indicative of form revision, the program proceeds to step S7, at which the color information of the pertinent form pattern in the form management table 7 is updated. If the received data is found to be indicative of form pattern selection, then the pertinent form pattern information is read out of the form pattern memory 6 and the pattern is developed in the page buffer 9 at step S8. The color information of the form pattern developed at step S9 is read out of the pertinent area 404 of the form management table 7 and is then written in the color designating register 12b.

If the received data are indicative of a control code relating to the printing color of character symbols to be printed over the form, then the program proceeds to step S10, at which the data to this effect are set in the color designating register 12a. (It should be noted that information indicative of the color "black" is set as initial data when power is introduced to the color designating registers 12a and 12b.)

If "NO" answers are received at all of the decision steps S1, S2, S3, S4 and S5, namely if it is determined that the received data are indicative of a character code, then processing is executed from step S11 onward.

Step S11 calls for the character pattern generator 5 to generate a pattern corresponding to the inputted character code. The generated character pattern is developed in the page buffer 8 at step S12, after which it is determined at step S13 whether character patterns for one page of the form have been developed. If the answer is "NO", the program returns to step S1. On the other hand, when it is determined that the development of character patterns for one page of the form has ended, the program proceeds to step S14, at which composite printing is performed by the printing section 11.

The printing section 11 of the illustrated embodiment employs a laser beam printing system. The data contained in page buffer 8 and page buffer 9 are outputted to the printing section 11 via the printer interface 10 first from buffer 8 and then from buffer 9. Before the contents of each page buffer are outputted to the printing section 11, the contents of the color designating register of the page buffer are delivered to the printing section via the printer interface.

Figure 8:
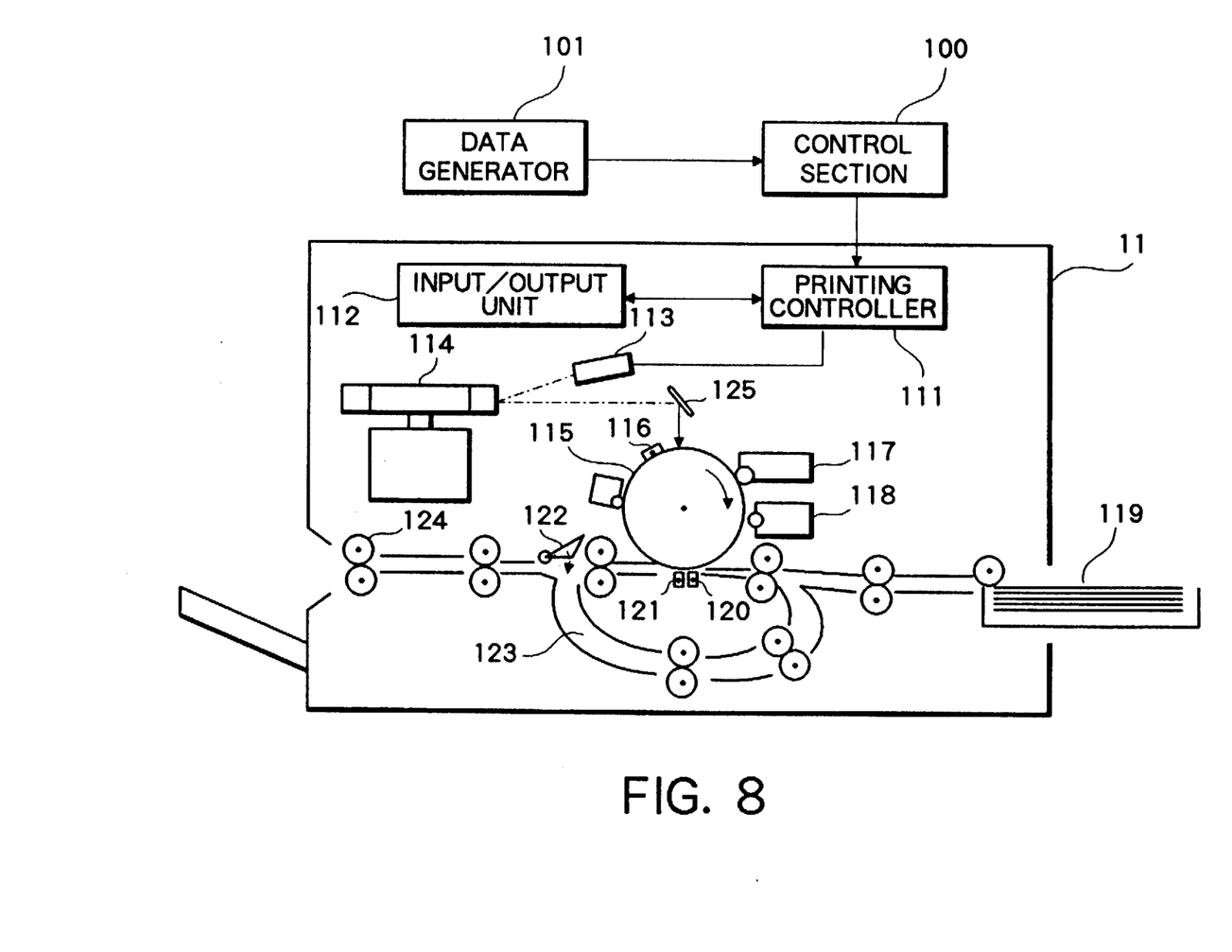
FIG. 8 is a view for describing the structure and operation of a printing section according to the embodiment FIG. 1.

The structure of the printing section 11 and the associated processing will now be described with reference to FIG. 8.

The printing section 11 includes a printing controller 111 for controlling the printing section 11, an input/output unit 112 serving as a control panel and display for prescribed messages, a developer 117 containing black toner, a developer 118 containing red toner, and a photosensitive drum 115. The two developers 117 and 118 are controlled by the printing controller 111 in such a manner that only one of them is brought into contact with the photosensitive drum 115 at one time.

The other components of the printing section, their arrangement and function will be apparent from the following description of the flow of printing processing.

The printing controller 111 is such that a single sheet of transfer paper is conveyed from a transfer paper cassette 119 to a predetermined position in front of the photosensitive drum 115 by driving rollers into rotation. When the transfer paper has arrived at a position at which printing is possible, a signal to this effect is delivered to the control section 100 to inform it of the fact. Upon receiving this signal, the control section 100 outputs the contents of the color designating register 12a to the printing section 11. Based on the color information in the color designating register 12a, the printing control unit 111 selects either the developer 117 or 118 and causes it to contact the photosensitive drum 115. Next, the printing control unit 111 causes the photosensitive drum 115 to rotate in such a manner that the surface thereof is electrified by a corona discharge device 116. When the data in the page buffer 8 is outputted by the control section 100, a laser light-emitting element 113 is driven based on the image data, thereby generating a laser light beam in on/off fashion. The surface of the photosensitive drum 115 is raster-scanned by the generated laser beam via a polygonal mirror 114, which is rotating at a constant speed, and a mirror 125. An electrostatic latent image is formed on the photosensitive drum 115 by the raster scanning operation. The electrostatic latent image is developed by the selected developer.

In synchronization with the foregoing operation, the transfer paper conveyed into the apparatus is fed in the direction of the photosensitive drum 115. The toner on the photosensitive drum 115 is transferred to the transfer paper by a transfer device 120, after which the transfer paper is separated from the photosensitive drum 115 by a separating device 121. The transfer paper thus delivered from the photosensitive drum 115 is conveyed by a roller 126, at which time the printing controller 111 causes a flapper 122 to rotate in the direction of the adjacent arrow shown in FIG. 8. As a result, the transfer paper is again conveyed to a predetermined position in front of the photosensitive drum 115 through a conveyance path 123.

Next, the control section 100 delivers the contents of the color designating register 12b corresponding to page buffer 9. Upon receiving this information, the printing controller 111 causes the developer (either 117 or 118) corresponding to this color to contact the photosensitive drum 115. From this point onward the series of image processing steps described above are executed based on the data in the page buffer 9. At this time the flapper 122 is maintained in the state illustrated in FIG. 8. As a result, the transfer paper is not conveyed in the direction of the conveyance path 123 but is fed out of the apparatus via rollers 124.

When all of the characters to be printed on the form have been transferred to the transfer paper, the latter is again returned to the printing starting position and the form pattern is printed on the paper in its own color so as to be superimposed on the characters. However, the invention is not limited to this arrangement. For example, it is perfectly acceptable for printing in two colors to be performed simultaneously. Such an arrangement and the operation thereof will now be described with reference to FIG. 9.

Figure 9:
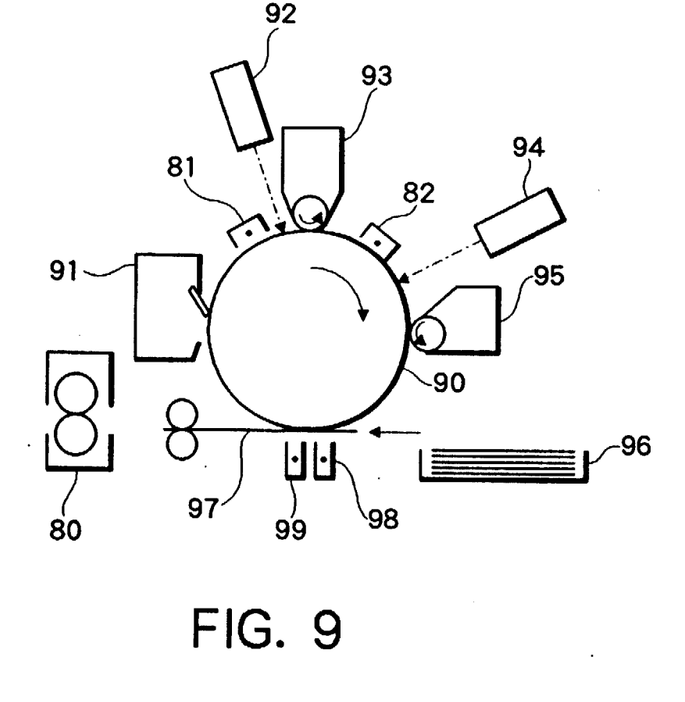
FIG. 9 is a view illustrating the structure of a printing section according to another embodiment of the invention.

An optical section (composed of a laser light emitting element, a polygonal mirror and the like) 92 exposes a photosensitive drum 90 to laser light for forming a black image. A developer 93 contains black toner. An optical section 94 has a structure similar to that of the optical section 92 and exposes the photosensitive drum 90 to laser light for developing a red image, the red toner for which is contained in a developer 95. The other components will be described in due course.

With a structure of this type, operation proceeds as follows when a two-color image is formed: First, the photosensitive drum 90, which is rotating at a constant speed in the direction of the arrow in FIG. 9, is uniformly electrified by a primary corona discharge device 81, after which an electrostatic latent image for producing a black image is formed on the photosensitive drum 90 by optical section 92. The black image is then developed by developer 93. Next, after the drum is uniformly electrified by a secondary corona discharge device 82, a red image is developed by optical section 94 and developer 95. Thereafter, the black and red toners developed on the photosensitive drum 90 are transferred to a sheet of transfer paper 97 that has been conveyed in from a paper cassette 96, and the transfer paper is subsequently fed out of the apparatus via a separator 99 and fixing device 80.

The operation of the control section 100 for the arrangement shown in FIG. 9 will now be described.

First, if the pattern output colors of page buffers 8 and 9 are the same, only one of the optical sections 92 and 94 corresponding to this color information is driven and development is performed by the corresponding developer. At this time, each bit of the image data developed in the page buffers 8 and 9 is outputted to the printing controller 111 in the form of a logical sum.

If the pattern output colors in page buffers 8 and 9 are different, image data outputted as a black image is formed into an image by optical section 92, and image data outputted as a red image is formed into an image by optical section 94.

Though a non-volatile RAM is used to register a form pattern in the present embodiment, it is possible to employ an external storage device such as a floppy disk instead. Though the printing section is described as being a two-color printing device, a device for printing three or more colors can be used. This will make it possible to readily ascertain the meaning of a form merely by looking at its colors.

Though the present embodiment are described in connection with a laser beam printer as one example, any printing device capable of printing in two or more colors will suffice. Hence, the invention is not limited to a laser beam printer.

Furthermore, in the present embodiments, the entirety of a selected form pattern is preserved in the page buffer 9 as long as there is no revision of a new form pattern. The reason for this is to realize a laser beam printer of high speed. However, if greater importance is placed upon effective utilization of memory rather than printing speed, as in the case of a serial printer, then it will be permissible to adopt an arrangement in which, whenever the printing head is caused to perform a scanning motion, a form pattern of the corresponding scanning line is generated. This will eliminate the necessity of providing each of the page buffers 8 and 9 with a memory capacity equivalent to one page.

In accordance with the present embodiments as described above, once a required form has been selected, all that need be done thereafter is to output character data which will be printed on the form in superimposed fashion, thereby enabling printing of a form having a specific color and on which the required subject matter has been printed. This is extremely convenient since it eliminates the need to manage sheets of form paper themselves.

In addition, if it is arranged so that a form pattern of selected information is preserved as long as there is no selection of new form information made, then the time needed for generating a selected form pattern can be eliminated. This makes it possible to supplement the above-described advantages with the advantage of higher printing speed.

As many apparently widely different embodiments of the present invention can be made without departing from the spirit and scope thereof, it is to be understood that the invention is not limited to the specific embodiments thereof except as defined in the appended claims.

What is claimed is:

1. An image output apparatus comprising:
    input means for inputting data; and
    processing means for processing data inputted by said input means and for outputting image information based on processed data,
    said processing means further comprising:
    a first memory unit for storing data related to form information to be outputted, and
    a second memory unit for storing color information representing a reproduction color for use in reproducing said form information.

2. The image output apparatus according to claim 1, wherein said first memory unit is capable of storing data relating to plural kinds of form information.

3. An image output apparatus for composite printing of image having at least two colors, comprising:
    input means for inputting character symbol information;
    first printing means for printing the inputted character symbol information on a prescribed printing medium;
    memory means for storing plural items of form information along with output color information proper to each item of form information;
    selecting means for selecting one item of stored form information;
    pattern generating means for generating a form pattern expressed by the form information selected by said selecting means; and
    second printing means which, when the character symbol information is printed on the printing medium by said first printing means, prints the form pattern generated by said pattern generating means on the printing medium in the output color proper to the form.

4. The image output apparatus according to claim 3, further comprising registration means for newly registering form information and output color information corresponding to this form information.

5. The image output apparatus according to claim 3, further comprising revising means for revising the form information stored in said memory means or the output color information of said form information.

6. The image output apparatus according to claim 3, wherein information inputted by said input means includes a control code, and said selecting means selects one item of form information based on said control code.

7. The image output apparatus according to claim 3, wherein said memory means is a writable non-volatile memory.

8. The image output apparatus according to claim 3, wherein said memory means is an external storage device.

9. The image output apparatus according to claim 3, wherein the form information is composed of rule mark information for forming a form pattern, logo mark information and character string information.

10. An image output apparatus for composite printing of images having at least two colors, comprising:
    input means for inputting character symbol information;
    first printing means for printing the inputted character symbol information on a prescribed printing medium;
    memory means for storing plural items of form information along with output color information proper to each item of form information;
    selecting means for selecting an item of stored form information;
    holding means for holding a form pattern expressed by the form information selected by said selecting means; and
    second printing means which, when the character symbol information is printed on the printing medium by said first printing means, prints the form pattern held by said holding means on the printing medium in the output color proper to the form.

11. The image output apparatus according to claim 10, further comprising registration means for newly registering form information and output color information corresponding to this form information.

12. The image output apparatus according to claim 10, further comprising revising means for revising the form information stored in said memory means or the output color information of said form information.

13. The image output apparatus according to claim 10, wherein information inputted by said input means includes a control code, and said selecting means selects one item of form information based on said control code.

14. The image output apparatus according to claim 10, wherein said memory means is a writable non-volatile memory.

15. The image output apparatus according to claim 10, wherein said memory means is an external storage device.

16. The image output apparatus according to claim 10, wherein the form information is composed of rule mark information for forming a form pattern, logo mark information and character string information.

17. An image output apparatus comprising:
    input means for inputting code data;
    a data processor for processing said code data inputted by said input means and for generating image information based on said code data;
    a memory unit for storing data related to one or more patterns along with position data corresponding to each pattern as form information;
    a first designating circuit for designating a color in which said form information is to be outputted; and
    a printing section for superimposing said image information and said form information, and for outputting the superimposed image on a printing medium,
    wherein said printing means section output is in the color designated by said first designating circuit as for said form information.

18. The image output apparatus according to claim 17, further comprising a second designating circuit for designating a color in which said image information is outputted, wherein said printing section output is in the color designated by said second designating circuit as for said image information.

* * * * *

UNITED STATES PATENT AND TRADEMARK OFFICE
CERTIFICATE OF CORRECTION

PATENT NO. : 5,020,004
DATED : May 28, 1991
INVENTOR(S) : MASARU IGARASHI

It is certified that error appears in the above-identified patent and that said Letters Patent is hereby corrected as shown below:

IN TITLE PAGE

Insert: -- [30] FOREIGN APPLICATION PRIORITY DATA
                 Jan. 20, 1988 [JP] Japan ....... 63-008288--.

COLUMN 1

Line 43, "within" should read --in--.
    Line 54, "of" should be deleted.

COLUMN 2

Line 1, "peculiar" should read --proper--.
    Line 31, "peculiar" should read --proper--.
    Line 45, "embodiment" should read --embodiment of--.
    Line 46, "in" should read --in a--.
    Line 47, "embodiment" should read --embodiment of--.
    Line 59, "ment" should read --ment of--.

COLUMN 3

Line 68, "data." should read --the data of form
            information 328.--.

COLUMN 4

Line 37, "for" should read --form--.

COLUMN 5

Line 42, "code 504" should read --code 505--.

UNITED STATES PATENT AND TRADEMARK OFFICE
CERTIFICATE OF CORRECTION

PATENT NO. : 5,020,004
DATED : May 28, 1991
INVENTOR(S) : MASARU IGARASHI

It is certified that error appears in the above-identified patent and that said Letters Patent is hereby corrected as shown below:

COLUMN 6

Line 27, "12aand" should read --12a and--.

COLUMN 8

Line 44, "embodiment" should read --embodiments--.

COLUMN 9

Line 30, "image" should read --an image--.

Signed and Sealed this

Sixteenth Day of March, 1993

Attest:

STEPHEN G. KUNIN

Attesting Officer     Acting Commissioner of Patents and Trademarks